Aug. 14, 1956   R. C. KIVLEY   2,758,337
EXTRUDER HEAD
Filed March 1, 1952
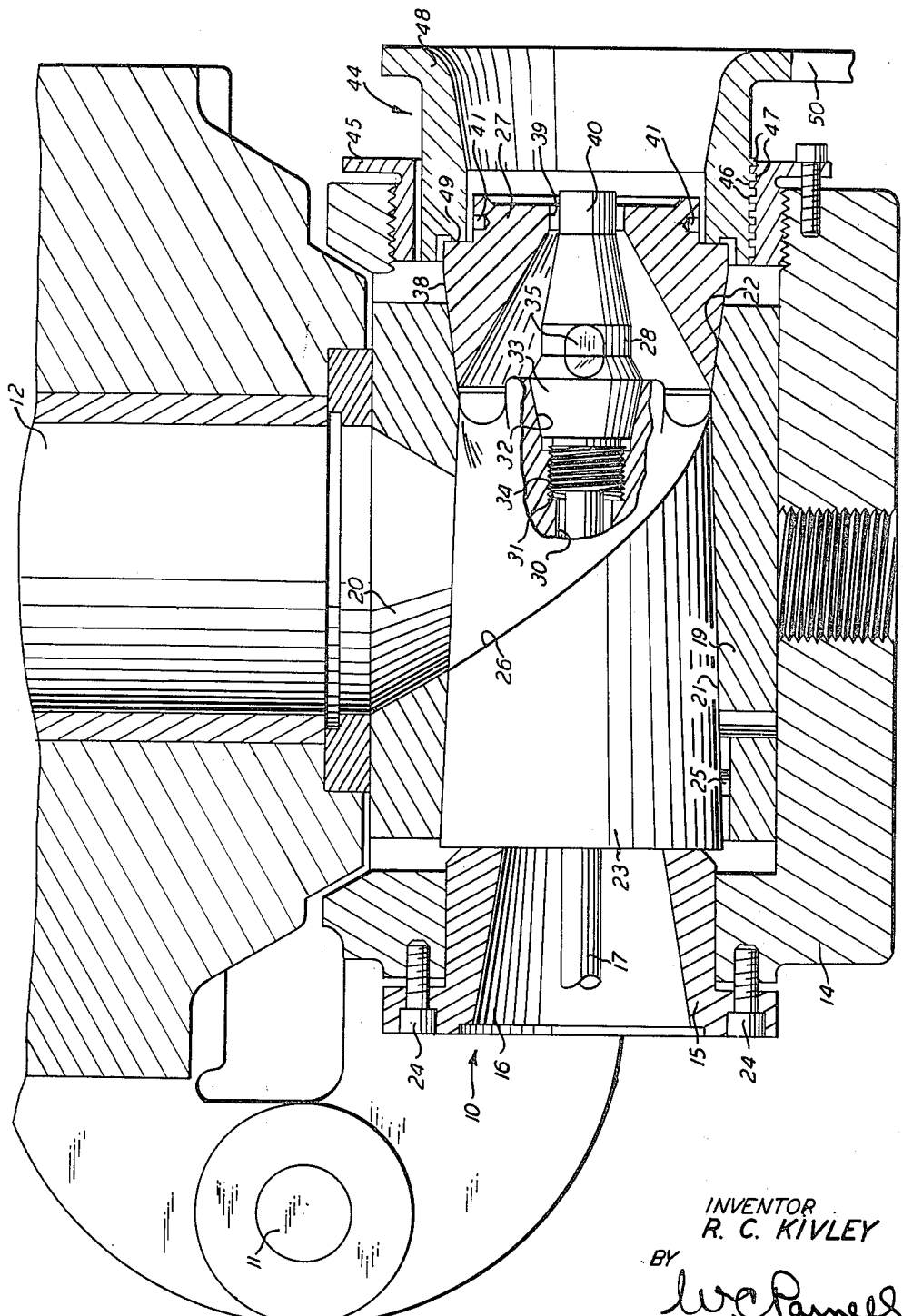
INVENTOR
R. C. KIVLEY
BY
W.C. Parnell
ATTORNEY

United States Patent Office 2,758,337
Patented Aug. 14, 1956

2,758,337
EXTRUDER HEAD

Ray C. Kivley, Kenmore, N. Y., assignor to Western Electric Company, Incorporated, New York, N. Y., a corporation of New York Application March 1, 1952, Serial No. 274,467

1 Claim. (Cl. 18—13)

This invention relates to extruding machines and more particularly to extrusion heads for cable sheathing machines.

In the manufacture of certain types of cable for use in the telephone art a plastic sheath is extruded on the cable core. Occasionally it is necessary to remove the tools of an extrusion head, for example, when they become worn, or to replace them with tools of different sizes depending upon the sizes of the cables to be extruded. The term "tools" refers to the core tube and die which respectively control the path of the cable core and the flow of the material about the core. When the tools of a conventional cable sheath extruder are to be changed, the front, or cable core exit, end of the head must be opened to replace the die and the rear, or core entrance, end of the head must be opened to replace the core tube. This involves, among other things, the removal of a number of bolts at each end of the head and a reassembly of the parts, all of which require so much time that the plastic decomposes making it necessary to open the head gate and clean out the machine each time the tools are changed.

The object of the present invention is an extrusion head for a cable extruding machine wherein the tools are readily replaceable and self-centering.

With this and other objects in view, the invention comprises an extrusion head for a cable sheathing machine wherein the die is held in place by a quick acting clamp removable to give access to both the die and core tube so that they may be removed and replaced by another set with minimum loss of time. The tools of each set have tapered portions for engaging axially aligned tapered apertures in their supports to locate the tools properly in a set up which can be readily reproduced without further experiment whenever required.

In the present embodiment of the invention the die block is provided with a central opening formed with two tapered portions, one to receive and accurately position the core tube holder while the other receives and accurately positions the die. The positioning of the core tube holder relative to the die positions also the tapered aperture of the holder to receive the tapered portion of the core tube to assure centering of the core tube relative to the die.

Other objects and advantages will be apparent from the following detailed description when considered in conjunction with the accompanying drawing which illustrates a vertical sectional view of the extrusion head and its association with the cylinder of a sheathing machine.

Referring now to the drawing, the extrusion head indicated generally at 10 is hinged at 11 for movement into and out of registration with the cylinder 12 in which material is placed, to be forced downwardly in the conventional manner into and through the extrusion head.

The extrusion head 10 includes a housing 14 open at the entrance end to receive a member 15 which is centrally apertured at 16 for the passage of a cable core 17. A die block 19 mounted in the housing 14 has an opening 20 for registration with the cylinder 12 and a longitudinally extending aperture including opposing tapered portions 21 and 22. A core tube holder 23 has an outer contour which in general is tapered to be received in the tapered portion 21 of the aperture of the die block whereby the position of the core tube holder will be accurately controlled relative to the die block and particularly the tapered portion 22. The core tube holder is held in place by the member 15 through the assistance of the screws 24. A projection 25 of the holder receivable in a slot in the die block controls the position of the holder relative to the cylinder 12. The core tube holder 23 is empirically contoured at 26 whereby through the assistance of concentrically positioned tools such as a die 27 and a core tube 28, the material may be extruded uniformly about the core 17.

The core tube holder 23 has an aperture 30 extending longitudinally therethrough, the exit end of the aperture having an enlarged threaded portion 31 and a tapered portion 32. The tapered portion 32 is disposed at a given position relative to the tapered portion 22 of the die block when the core tube holder is mounted in place. The core tube 28 is centrally apertured to receive a core of a particular size and this core tube may be selected from a group of core tubes which are identical in structure with the exception of possible variations in the sizes of their apertures and their outer ends to receive cores of various sizes and cooperate with the die 27 designed to be associated therewith to control the thickness of the sheath of material to be extruded on the core. The core tube 28 shown in the drawing has a tapered portion 33 receivable in the tapered portion 32 of the aperture 30 to accurately position the core tube relative to the die 27. A threaded portion 34 of the core tube is receivable in the threaded portion 31 of the aperture 30 and the threads of these portions are constructed so that they may be sufficiently loose in their interengagement with each other to permit perfect seating of the tapered portion 33 in its tapered portion 32. The core tube 28 has a group of diametrically positioned flat surfaces 35 whereby the tube may be mounted in or removed from the holder readily by the aid of a tool.

The die 27 may be selected from groups which are identical with the exception of their aperture which vary with their various cable cores. The die shown is circular in cross-section and has a tapered portion 38 receivable in the tapered portion 22 of the aperture in the die block 19 whereby the die may be readily inserted in place or removed from its mounted position. Furthermore, the aperture 39, through this means, will be automatically centered with the outer portion 40 of the core tube. Although die aperture 39 and the outer portion 40 of the core tube may be of various sizes depending upon the sizes and contours of the cable cores to be extruded their concentric positioning is assured by their tapered mountings. Tool receiving apertures 41 may be employed to assist in removing the die from its die block when the clamping means indicated generally at 44 is removed.

The clamping means in the present embodiment of the invention is a breach block type of clamp including a fixed member 45 mounted in the front or exit opening of the extrusion head and including sets of threads 46 for quick engagement with sets of threads 47 of a member 48. The member 48 is formed to engage a shoulder 49 of the die 27 and through the assistance of a handle 50 the member 48 may be readily removed from the member 45 exposing the die 27 so that it may be readily removed, freeing the core tube for removal through the assistance of a tool.

The extrusion head is constructed so that the associated parts, including first the die block and the core tube holder and later the die and the core tube are automatically positioned with respect to each other in assembly to assure uniform extrusion of the material about the advancing core. The tapered portion 21 of the die block first assures accurate positioning of the core tube holder relative to the tapered portion 22, and in so doing, the tapered portion 32 will assure accurate positioning of the core tube relative to the tapered portion 22. Furthermore, through this arrangement concentric positioning of the core tube in the die opening is assured. Therefore, with the rapid actuable clamping means 44—45, it is possible not only to readily clamp the tools in the extrusion head but to free them for removal rapidly and the insertion of another set of tools with the assurance of accurate positioning of these tools without the loss of time which would result in decomposition of the material.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

An extrusion head for a cable sheathing machine wherein one set of core tube and die for a cable core of a given size may be removed readily and replaced by another set of core tube and die for a cable core of a different size, the extrusion head comprising a housing mounted on an exit end of a cylinder for material to be extruded about cores of different sizes singly, a die block mounted in the housing open to the cylinder and having an aperture extending longitudinally therethrough with portions of the aperture tapering outwardly toward entrance and exit ends respectively thereof, a core tube holder grooved to receive the material from the cylinder and having an outer surface tapered outwardly toward an entrance end thereof to be received and centered in the portion of the aperture in the die block tapering toward the entrance end thereof, the core tube holder having a longitudinal aperture, for the cable cores of different sizes singly, including an outwardly tapered exit end and an adjacent threaded portion, a die having an opening therein, for a cable core of a predetermined size, concentric with a tapered outer surface for removably centering the die in the exit end portion of the aperture of the die block, a clamp supported by the housing to firmly hold the die in the exit end portion of the aperture of the die block and readily removable from the housing to free the die for removal from the die block, and a core tube for a cable core of a predetermined size, readily accessible on removal of the clamp and die, having a tapered portion receivable in the tapered exit end of the aperture of the core tube holder and a threaded portion adapted to fit sufficiently loose in the threaded portion of said aperture to cause the tapered portion of the core tube to seat centrally in said aperture with an exit end of the core tube concentric with the opening in the die.

References Cited in the file of this patent

UNITED STATES PATENTS

| | | |
|---|---|---|
| 288,795 | Hamon | Nov. 20, 1883 |
| 1,427,698 | Poliakoff | Aug. 29, 1922 |
| 1,770,985 | Kivley | July 22, 1930 |
| 2,035,247 | Royle | Mar. 24, 1936 |
| 2,366,528 | Heath | Jan. 2, 1945 |
| 2,465,482 | Rhodes | Mar. 29, 1949 |
| 2,522,364 | Grana | Sept. 12, 1950 |
| 2,560,778 | Richardson et al. | July 17, 1951 |
| 2,591,508 | Brown | Apr. 1, 1952 |

FOREIGN PATENTS

| | | |
|---|---|---|
| 535,692 | France | Apr. 19, 1922 |
| 857,774 | France | Sept. 28, 1940 |
| 876,573 | France | Nov. 10, 1942 |